Figure 1:
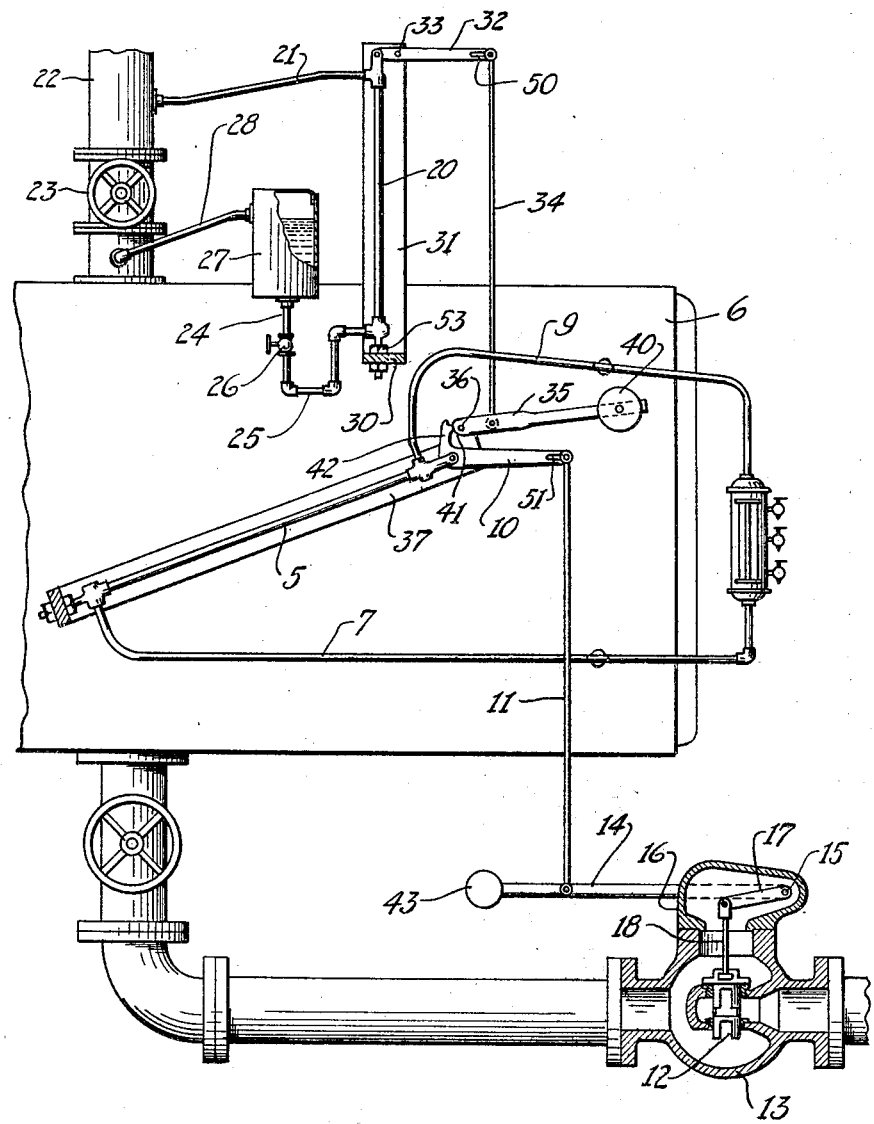

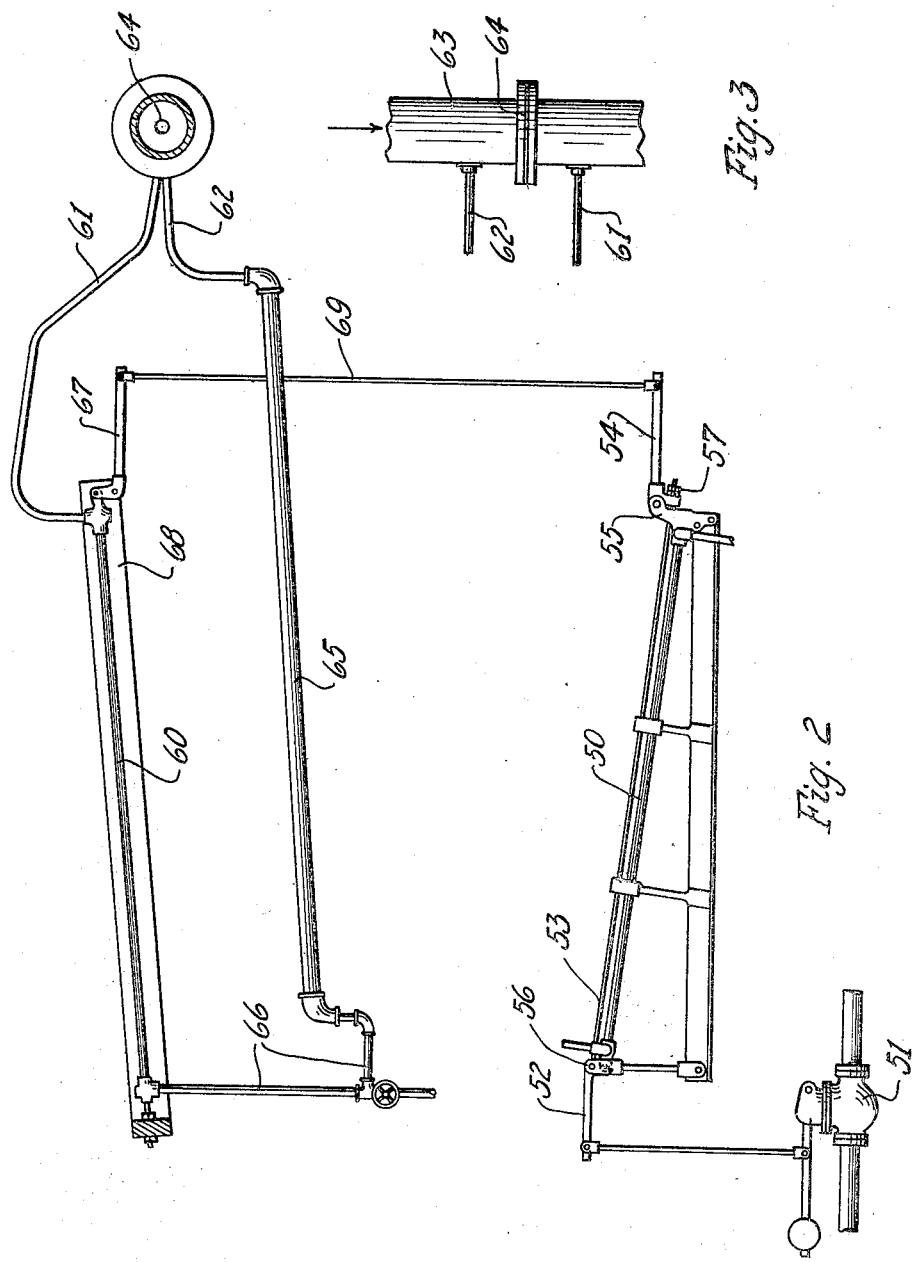

Patented Aug. 9, 1932

1,870,706

UNITED STATES PATENT OFFICE

GRANT D. BRADSHAW, OF BEAVER, PENNSYLVANIA

FEED-WATER REGULATOR

Application filed March 27, 1929. Serial No. 350,281.

This invention relates to feed-water regulators and it has for its object providing a feed-water regulator which is adapted to produce certain results, in addition to the ordinary results obtained by feed-water regulators generally in use. One of the objects of the invention is to provide a system by means of which the water feed to the boiler can be controlled by the load on the boiler as well as by the water level in the boiler. A further object is to compensate more or less for the variations in water level which are produced by sudden material changes in the load on the boiler, or in the fire intensity, or both, and to correlate such changes with the permanent load or fire changes, so as to eliminate undesirable results which have followed the art heretofore. Other objects of the invention will be apparent from a consideration of the drawings hereto attached and the following description thereof:

The accompanying drawings, Fig. 1 illustrates an elevation of a boiler and a feed-water regulator system which embodies the features of my invention; Fig. 2 illustrates an elevation of a modified form of the system; and Fig. 3 is a plan view of a portion of the steam main of the system.

The benefits which I obtain by my invention can be obtained by the use of various ordinary types of feed-water regulators. For the purpose of illustrating the invention, I have disclosed herein what is called the thermostat type of feed-water regulator. A portion of the system comprises an ordinary thermostat regulator 5 which is mounted with reference to the boiler 6, so that the central portion of the thermostat is normally substantially at the same elevation as the average water level in the boiler, as is common to this type of regulators. The lower end of the theremostat is connected, by means of the pipe 7, with the lower portion of the boiler, and the upper end of the thermostat is connected, by means of a pipe 9, to the upper portion of the boiler.

The thermostat 5 operates a lever 10, the fulcrum of which is hereinafter described, and by operating a rod 11, the plunger 12 of the feed-water valve 13 is operated. The plunger 12 is associated with the rod 11 by means of an arm 14 fixed to a spindle 15 passing through the casing 16 mounted on the valve; and an inner arm 17, also fixed to the spindle, operates the valve stem 18 and the plunger 12. The operation of the thermostat 5 on the plunger 12 is in an ordinary manner and, so far as my invention is concerned, the only new feature of consequence in this mechanism is in the lever 10. In operation, the valve normally is open sufficiently to supply water as fast as called for by the load on the boiler. If the water-level in the boiler and, hence, in the thermostat, rises, the thermostat will close the valve more; and it will open the valve more as the water level sinks. That is, the effect is to change the valve opening inversely as the water-level varies.

I also provide a second thermostat 20, which is preferably vertically mounted, but may be inclined more or less to the vertical. The upper end of this thermostat is connected, by means of the pipe 21, to the steam main 22 of the boiler. The lower end of the pipe is connected, by means of communicating mechanism, also to the steam main and, between the two points of connection, an orifice 23 is mounted in the steam main. This orifice may be of any suitable nature. I prefer for the purpose an ordinary type of gate valve for steam use.

The lower end of the thermostat 20 is connected to the main by means of a pipe 24 having a loop 25 therein and, preferably, a valve 26. The pipe 24 has its upper end connected to the lower portion of a water container 27, and the upper portion of this container is connected to the steam main by the pipe 28. In use, the container 27 is nearly full of water and water in the thermostat will stand at a somewhat higher level than in the container, depending on the load on the boiler. The steam condensing in the thermostat 20 will keep the water level in the container 27 normally at the same elevation as the lower portion of the upper end of the pipe 28. Any excess water will flow through the pipe to the boiler.

The thermostat 20 is adjustably fixed at its lower end to a flange 30 of a fixed supporting plate 31, and the upper end is pivotally connected to a lever 32 which has its fulcrum 33 fixed to the plate 31. The other end of the lever 32 is pivotally connected, by means of a rod 34, to a cam lever 35 which is pivoted at 36 to the plate 37 which supports the thermostat 5. On the outer end of the lever 35 is mounted a weight 40 and the other end of the lever bears a cam surface 41 against which the arm 42 of the lever 10 rests. A weight 43 on the arm 14 holds the cam surfaces at all times together.

The thermostat 20 is affected by the steam pressures each side of the orifice 23, and the water elevation in the tube 20 will vary directly proportional to the drop in steam pressure through the orifice. As this drop increases, the water level in the tube 20 will rise and the tube will contract and elevate the weighted end of the lever 35 and, by means of the cam surface 41, this action will raise the arm 10 and tend to open the valve. The drop in steam pressure through the orifice 23 will vary as the load on the boiler varies. As the load increases, the drop will become greater; and the water in the tube 20 will rise and, thus, cause the tube to contract and open the valve more.

With this arrangement, it will thus be seen that, an increase in load on the boiler will tend to raise the water in the thermostat 20 and will thus tend to open the feed-water valve more, and the same increase in load will lower the boiler water level and cause the thermostat 5 also to open the valve more. As a consequence, the ordinary operation of these two thermostats coacting on the valve will tend to vary the valve opening more with given changes of load than occurs with the thermostat 5 alone.

With the ordinary feed-water regulators operated by the variations in water level in the boiler, it is common to cause the water-level elevation to vary inversely as the load, so that, with heavy loads, the level is often much lower than it is with light loads. But, with some boilers working under certain conditions, it is desirable to reduce this effect so as to hold the water level more nearly uniform during load changes; and, with my system, the level can be caused to lower with the load or remain substantially uniform, or even rise with the load when desired. It is well understood that, in case of sudden increases in load, the consequent reduction in steam pressure in the boiler allows material expansion of entrained steam in the water and this forces upwardly the water level; so that, if the water level is too high when the increase occurs, the water may be forced entirely too high. Or, when the reverse occurs, the water may lower to a dangerous extent.

With my system, the effect of the tube 20 can be varied. For instance, by means of a slot 50, the leverage of the lever 32 may be varied so as to affect more or less the operation of the cam. Also, by varying the magnitude of the orifice 23 by opening or closing the valve, the effect of the tube may be varied. By opening the valve wide, the effect of the tube substantially disappears, as the drop in pressure is reduced substantially to zero. Or, if not, by closing the valve 26, the effect of the tube may be entirely eliminated. On the other hand, by reducing the orifice 23, the effect of the tube is increased. Hence, by manipulation in this manner, the tube 20 may entirely offset the tendency of the tube 5 to vary the level inversely as the load and to keep the level uniform or even vary it directly with the load.

It will also be understood that the relative effects of the two thermostats may be varied otherwise, for instance, by varying the shape of the cam 41 or by varying the effect of the lever 10 by means of the slot 51. The effect of the tube 20 may also be varied by varying its elevation by means of the nuts 53.

My invention is of value in preventing abnormal low or high levels in the boiler, particularly certain types of boilers, and also when certain types of fuel, such as powdered fuel, are used. As is well understood, sudden changes in the steam pressure in the boiler, by material variations either in load or in fire intensity, will very materially vary the water level in the boiler, irrespective of the amount of outflow or inflow, as the entrained steam in the water expands or contracts, as the case may be, and thus varies the elevation of the water level. By the use of my invention, by maintaining a lower water level with light loads, or a higher water level with heavy loads, than is common with the ordinary system, when these sudden changes in water level occur, the abnormal variations in water level will be less objectionable.

But, inasmuch as the thermostat 20 tends to increase the flow to the boiler when the load increases, and as the load increase is likely to cause a temporary rise in the boiler water, I provide means for delaying the action of the thermostat 20 on the inflow until the temporary variation in water level is substantially overcome by the greater outflow of steam. In this instance, this means comprises the valve 26. By closing somewhat the valve 26, the time required for the water level in the tube 20 to vary is increased, and by the proper setting of this valve 26 with reference to the particular conditions of the boiler system, the action of the thermostat 20 can be delayed to suitably meet the conditions. In general, this action can be delayed until the temporary variation in water level has disappeared and the action of the thermostat 20 is desired.

Fig. 2 illustrates more or less diagrammatically a modification of the system. This modification comprises the thermostat 50 which is connected to the boiler and controls the feed-water valve 51, in accordance with the water level variations in the boiler, substantially the same as the thermostat 5. The thermostat 50, however, has the lever 52 fulcrumed on the end of the tension rod 53. The other end of the tension rod is associated with the short arm of the lever 54 which is pivoted to the fixed support 55. The position of the fulcrum 56 of the lever 52 may be adjusted by means of nuts 57.

The other thermostat 60 is connected, by means of pipes 61 and 62, to the steam main 63 on opposite sides of the orifice 64, so that the elevation of the water in the thermostat 60 depends upon the fall in steam pressure through the orifice. The lower end of the thermostat 60 is connected to the main by means of a relatively large pipe 65 and by smaller pipes 62 and 66. The large pipe 65 contains an adequate supply of cool water, so that the water in the tube 60 is maintained at a materially lower temperature than the steam. But the supply of water in the tube is maintained by the condensed steam therein at an elevation which is not less than the lower end of the thermostat, as the lower end is substantially on a level with the lower side of the pipe 62 where it enters the steam main.

The thermostat 60 is arranged to operate a lever 67 pivoted to the beam 68 and, by means of a rod 69, it operates the lever 54 and, thus, controls the position of the fulcrum 56. The pipes 66 may be varied in size and length to produce such lag, if any, in the action of the thermostat on the fulcrum as the conditions may require.

In operation, the thermostat 50 controls the position of the feed-water valve 51 according to the variations in water level in the ordinary manner, entirely irrespective of the operation of the thermostat 60. But in case of a change in load on the boiler, the thermostat 60, by operating the lever 54, varies the position of the opening of the feed-water valve, so as to vary the flow of water as the load varies, substantially as is the case with the thermostat 20. In case of a decrease in load, the drop in pressure through the orifice 64 will decrease, the water in the tube 6 will lower, the thermostat will expand, and, by means of the connecting levers and rods, the valve 51 will be closed somewhat more than before the load change.

It will thus be seen that, with either of these systems, in case of a sudden material decrease in load, danger of flooding the boiler is eliminated as the action of the secondary or steam controlled thermostat is to shut down the valve materially more than would be the case with the water thermostat alone. And, if the steam controlled thermostat is adjusted so that there will be a lag in its action on the feed-water valve with reference to the load change, the temporary decrease in water level caused by the increase in steam pressure in the boiler will allow the water level controlled thermostat to hold the valve open and prevent the water in the boiler becoming too low for safety. On the other hand, in case of a sudden increase in load, the steam controlled thermostat will open the valve more and eliminate the hazard of the water sinking too low before the level controlled thermostat operates sufficiently. At the same time, if proper lag of the steam controlled thermostat is arranged for, this greater opening of the valve will be delayed until the belching up of the water, owing to the decrease in pressure in the boiler, has been overcome by the action of the water level thermostat and the increased flow of steam.

With the ordinary types of feed-water regulators, such as the regulators 5 and 50, in order to increase the water flow, the water level must sink; the inflow necessarily varies more or less inversely with the water-level elevation. This is sometimes desirable. But, under certain boiler conditions, it is desirable to vary the inflow directly with the water level elevation, so as to provide a high water level with heavy loads and low level with light loads. This may be accomplished with my systems. While the water-level regulator alone would provide a level inversely as the load, the steam regulator, by suitable adjustments of leverages, thermostat length, inclination, or otherwise, will more than offset the inverse action and produce level variations directly with the load. For instance, by increasing the ratio of the long arm to the short arm of lever 67 or decreasing the ratio of lever 54, this direct action may be produced and varied as desired. As a consequence, the amount of inflow, owing to load increases, exceeds the amount of outflow and this raises the water level as the load increases, and the reverse follows a decrease in load; but, at the same time, the inflow substantially equals the outflow when the outflow is uniform. It is true, there is some lag in the time of the action of the thermostat with reference to time of the load change, owing to time required to shift the water level in the thermostat and to change its temperature; but this is offset by the lag of the thermostat in ceasing its action after the load change has returned to normal.

This method of operation eliminates danger of flooding some boilers by the belching up of the water when a heavy load is suddenly added, as the level is low when the change occurs. The method also eliminates danger of flooding certain types of boilers on reducing materially a heavy load, as the water-level regulator is in condition to close down the feed valve the instant the stream flow regulator allows it to do so.

I claim as my invention:

1. In a boiler system, the combination of two feed-water regulators, one regulator being responsive to variations in steam flow from said system, and the other regulator being responsive to variations in water level in a boiler of said system, means operatively connecting said regulators with the feed water valve of the boiler, said means comprising a lever operatively connected to said water level responsive regulator, and means actuated by said steam flow responsive regulator for varying the position of the fulcrum of said lever, said latter means comprising a cam.

2. In a boiler system, the combination of two feed-water regulators, one regulator being responsive to variations in steam flow from said system, and the other regulator being responsive to variations in water level in a boiler of said system, means operatively connecting said regulators with the feed water valve of the boiler, said means comprising a lever operatively connected to said water level responsive regulator, and means actuated by said steam flow responsive regulator for varying the position of the fulcrum of said lever, said operatively connecting means also comprising a lever operated by said steam flow responsive regulator, and means operated by said latter lever for varying the position of said fulcrum.

3. In a boiler system, the combination of two feed-water regulators, one regulator being responsive to variations in steam flow from said system, and the other regulator being responsive to variations in water level in a boiler of said system, means operatively connecting said regulators with the feed water valve of the boiler, said means comprising a lever operatively connected to said water level responsive regulator, and means actuated by said steam flow responsive regulator for varying the position of the fulcrum of said lever, said operatively connecting means also comprising a lever operatively connected with said steam flow responsive regulator, and a cam operated by said latter lever for varying the position of said fulcrum.

In testimony whereof, I hereunto set my hand.

GRANT D. BRADSHAW.